Oct. 22, 1968   H. G. JOHNSTON   3,406,948
METHOD AND APPARATUS FOR BLENDING
Filed Aug. 6, 1965   2 Sheets-Sheet 1

INVENTOR
HOLBROOKE G. JOHNSTON
BY Irvin A. Lavine
ATTORNEY

Oct. 22, 1968  H. G. JOHNSTON  3,406,948

METHOD AND APPARATUS FOR BLENDING

Filed Aug. 6, 1965  2 Sheets-Sheet 2

INVENTOR
HOLBROOKE G. JOHNSTON

BY *Irvin A. Lavine*

ATTORNEY

United States Patent Office 3,406,948
Patented Oct. 22, 1968

3,406,948
METHOD AND APPARATUS FOR BLENDING
Holbrooke G. Johnston, 6414 Elliot Place,
Hyattsville, Md. 20783
Filed Aug. 6, 1965, Ser. No. 477,678
23 Claims. (Cl. 259—6)

ABSTRACT OF THE DISCLOSURE

A blender apparatus having reticulated sheet like elements, as of expanded metal, providing multiple openings defined by edges, which elements are moved, as by rotation, at high relative velocities while ingredients are passed through them. One element and its drive are mounted on a movable plate forming part of the housing. A method in which ingredients are passed through plural relatively moving reticulated elements.

---

There have been produced and sold various cake and bread baking mixtures for use in the home, to which a liquid such as milk or water, and possibly an egg, are the only ingredients to be added by the housewife. These baking mixes contain one or more kinds of flour, sugar, shortening in either liquid or solid form, a leavening agent, and possibly flavoring. In preparing these baking mixes, the mill passes the selected ingredients through a mixing or blending machine, which is intended to process them into a mix which is relatively homogeneous.

The presently used machines require relatively large motors to process the ingredients. Further, the baking mixes are not always produced with the desirable homogeneity, so that a particular type of mix produced on a given day will not have the same qualities as the same type of mix produced on another day, even when the same machinery and apparently same ingredients are used.

In addition, the processing equipment used is generally difficult to clean, it being understood that the equipment must be very thoroughly cleaned after processing one type of mix in preparation for the processing of a different type of mix. Failure to give the equipment a thorough cleaning will result in the inclusion in the following mix certain ingredients which are characteristic of a preceding mix, flavoring being a noteworthy example of such an ingredient.

By way of example, one type of baking mix processing equipment presently in wide use provides for blending of the ingredients in a horizontal chamber through which the ingredients pass and in which the ingredients are stirred by a plurality of paddles extending radially from a central rotor. It has been found that among other characteristics, it is a time consuming task to clean each of the paddles, resulting in an undesirably long "down-time." The motor of this machine is relatively large.

An object of the present invention is to provide apparatus for blending baking mix ingredients with significantly smaller motors than with known equipment.

Another object of the present invention is the provision of a method and apparatus for blending mix ingredients which will yield relatively homogeneous mixes during one batching operation and over a number of batching operations.

Yet another object of the present invention is to provide an apparatus for blending baking mix ingredients which is relatively easy to clean and which requires a minimum of "down-time."

A further object of the present invention is the provision of an apparatus for blending baking mix ingredients which is readily fabricated of available materials.

Another object is to provide a blender and a method of blending which will effectively blend various ingredients by causing them to be repeatedly struck by multiple edges providing high impact energy to the ingredients.

Other objects and many of the attendant advantages of the present invention will be readily understood from the following specification and drawings, wherein.

Figures 1, 2:
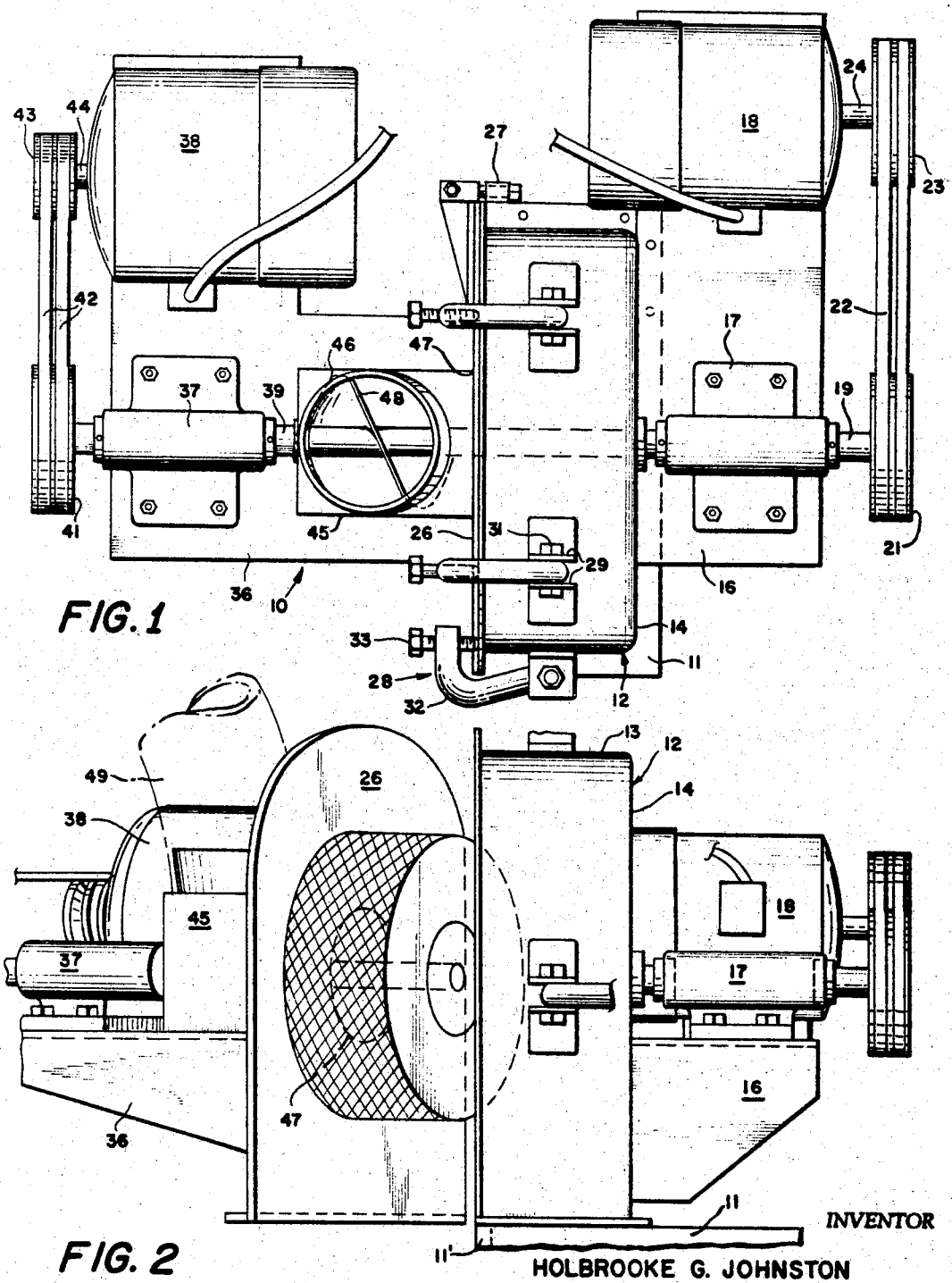
FIG. 1 is a plan view of a blender embodying the present invention, with parts broken away.
FIG. 2 is an elevational view of the blender of FIG. 1, in open position.

Referring now to the drawings, wherein like or corresponding parts are designated with like or corresponding reference numerals throughout the several views, there is shown in FIG. 1 a blender generally designated 10, and including a base 11, having an outlet 11' in the bottom. On the base 11 is mounted a housing 12 including an inverted U-shaped plate 13 (see FIG. 2) and a vertically extending transverse end wall 14 secured thereto, as by welding. A support structure 16 is secured to end wall 14 and supports a bearing 17 and a motor 18. Bearing 17 has journaled therein a shaft 19 on which is a pulley 21 which is driven by means of V-belts 22 from pulleys 23 on the shaft 24 of motor 18. Shaft 19 extends through end wall 14.

An end closure plate 26 forms a part of the housing 12, and is similar in shape to end wall 14. Closure plate 26 is pivotally mounted to the U-shaped plate 13 along a vertical edge thereof by hinge means 27, which have a vertical pivotal axis and thereby provide for swinging movement of closure plate 26 in a horizontal manner. Releasable locking elements 28 are provided about the periphery of U-shaped plate 13, the organization of each locking element 28 including a pair of outstanding ears 29 having a bolt 31 extending through them and pivotally securing a locking arm 32 which is of hooked configuration and which has a locking screw 33 threaded in the end thereof, for engagement with the closure plate 26. By means of the locking elements 28, the closure plate 26 may be securely held against the U-shaped plate 13 and released therefrom for swinging action on hinge means 27.

Secured to closure plate 26 is a support structure 36 on which is mounted a second bearing 37 and a second motor 38. A second shaft 39 is journaled in the bearing 37, and carries on its end a pulley 41 which is rotated by V-belts 42 driven from a pulley 43 on the shaft 44 of motor 38.

A feed housing 45 is carried by the closure plate 26 and extends from closure plate 26 towards bearing 37. Feed housing 45 has an inlet opening 46 in the upper part thereof, and an outlet opening 47 which communicates with a corresponding opening in closure plate 26. The shaft 39 extends through the feed housing 45, and within feed housing 45 has fixed on it a feed screw 48. A flexible inlet conduit 49 is attached to feed housing 45 at inlet opening 46, as shown in FIG. 2.

Figure 3:
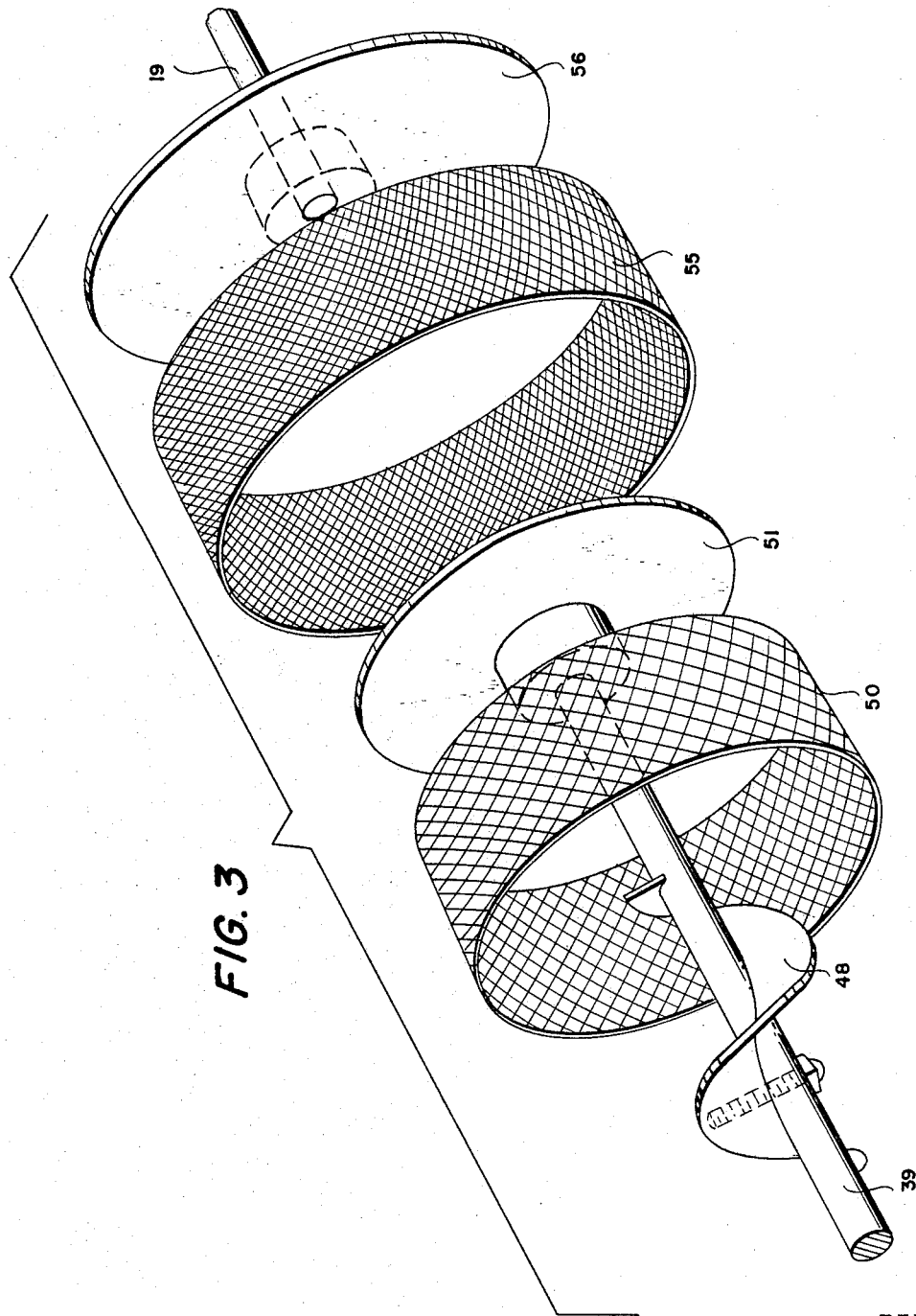
FIG. 3 is an exploded view of parts of the blender of FIGS. 1 and 2.

Referring now to FIGS. 2 and 3, there is provided within the housing 12 a first relatively small cylindrical reticulated element 50 which is carried by a circular plate 51 mounted on the shaft 39. A second, relatively larger cylindrical reticulated element 55 is carried by a circular plate 56 which is secured to the first shaft 19.

As is best indicated in FIGS. 1 and 3, the ingredients are delivered into the interior of element 50 by the feed screw 48, the ingredients falling downwardly after leaving the end of feed screw 48, and being projected so as to be distributed axially along element 50. Element 50, rotated by shaft 39, has a peripheral velocity of approximately 4,200 feet per minute, and is made of sheet-like relatively coarse reticulated or expanded metal, having diamond shaped openings nominally ¾" by 1½". The ingredients are struck by numerous edges of the element 50 and have a substantial amount of dynamic energy imparted to them, causing the ingredients to scatter and to undergo a first intermixing. Also, the ingredients are given a velocity in the circumferential direction of rotation of element 50; a portion of the ingredients striking element 50 are also given an outward velocity away from the axis of shafts 19 and 39. Due to a certain amount of coherence of the ingredient mass, a part of the ingredients are believed to recirculate within element 50. When the ingredient mass passes through element 50 and traverses the space or zone to element 55, which is concentric with and encompasses element 50, it is struck by the element 55, rotating by shaft 19 in the opposite direction to element 50. Element 55 has a peripheral velocity of approximately 8,350 feet per minute, and is made of sheet-like relatively fine reticulated or expanded metal having diamond shaped openings nominally ½" by 1". Thus the opposing directions of movement of the ingredient mass, the relative velocity of the ingredient mass and the relatively large number of striking elemental portions of the element 55 result in the homogenization of the ingredients. The thus homogenized ingredients then pass through the space between element 55 and housing 12, and out through outlet 11'.

The cylindrical form of the sheet-like elements 50 and 55 is preferred, although it is contemplated that ingredients may be processed by other constructions, such as conical elements and elements in belt form, for example.

The blender of the present invention may be readily cleaned by releasing the locking elements 28, swinging open the closure plate 26, and impinging compressed air against the several parts of the blender, this action being accomplished by one man in a few minutes, depending upon the particular ingredients of the previous mix. Thus, down time of the blender is minimal.

Further, production with the present blender results in a significant increase in the rate of production of baking mix in comparison with presently used equipment, the product being homogeneous and without undesirable lumps.

It will be obvious to those skilled in the art that various changes may be made without departing from the spirit of the invention and therefore the invention is not limited to what is shown in the drawings and described in the specification but only as indicated in the appended claims.

What is claimed is:

1. A blender comprising a base, a hollow inverted U-shaped housing on said base having an end wall, a bearing on the outside of said housing, a motor mounted on the outside of said housing, a shaft journaled in said bearing and extending into said housing, means drivingly connecting said motor to said shaft, an end closure plate for said housing opposite said end wall, means vertically pivotally mounting said plate on said housing, means for releasably locking said plate against said housing, a second bearing carried by and in spaced relation to said plate, a second motor carried by said plate, a shaft in said second bearing and extending into said housing concentric with said first mentioned shaft, means drivingly connecting said second motor with said second shaft for rotation oppositely to said first shaft, a feed housing surrounding said second shaft intermediate said second bearing and said plate and communicating with the interior of said housing through said plate, feed screw means carried by said second shaft in said feed housing, inlet means in said feed housing, a first relatively large cylindrical element in said housing connected to said first shaft, a second relatively small cylindrical element within said first element and concentric therewith connected to said second shaft, said elements each being reticulated with plural edges defining openings therethrough, and outlet means extending through the bottom of said housing.

2. The blender of claim 1, said first and second elements being of expanded metal.

3. The blender of claim 1, said first element having finer openings than said second element.

4. The blender of claim 1, said first element having a higher velocity than said second element.

5. A blender comprising a base, a hollow inverted U-shaped housing on said base having an end wall, a shaft extending into said housing, means for rotating said shaft, an end closure plate for said housing opposite said end wall, means vertically pivotally mounting said plate on said housing, means for releasably locking said plate against said housing, a bearing carried by and in spaced relation to said plate, a motor carried by said plate, a shaft in said bearing and extending into said housing concentric with said first mentioned shaft, means drivingly connecting said motor with said second shaft for rotation oppositely to said first shaft, a feed housing surrounding said second shaft and communicating with the interior of said housing through said plate, feed screw means carried by said second shaft in said feed housing, inlet means in said feed housing, a first relatively large cylindrical element in said housing connected to said first shaft, a second relatively small cylindrical element within said first element and concentric therewith connected to said second shaft, said elements each being reticulated with plural edges defining openings therethrough, and outlet means extending through the bottom of said housing.

6. A blender comprising a base, a hollow housing on said base having an end wall, a shaft extending into said housing, means for rotating said shaft, an end closure plate for said housing opposite said end wall, means vertically pivotally mounting said plate on said housing, means for releasably locking said plate against said housing, a second shaft extending through said plate into said housing concentric with said first mentioned shaft, means for rotating said second shaft oppositely to said first shaft, a feed housing surrounding said second shaft outwardly of said housing communicating with the interior of said housing through said plate, feed screw means carried by said second shaft in said feed housing, inlet means in said feed housing, a first relatively large cylindrical element in said housing connected to said first shaft, a second relatively small cylindrical element within said first element and concentric therewith connected to said second shaft, said elements each being reticulated with plural edges defining openings therethrough, and outlet means extending through said housing.

7. The blender of claim 6, said means for rotating said second shaft being carried by said plate.

8. A blender comprising a hollow housing, a shaft extending into said housing, means for rotating said shaft, an end closure plate for said housing, means pivotally mounting said plate on said housing, means for releasably locking said plate against said housing, a second shaft extending through said plate into said housing concentric with said first mentioned shaft, means for rotating said second shaft, means for feeding ingredients into said housing, a first relatively large cylindrical element in said housing connected to said first shaft, a second relatively small cylindrical element within said first element and concentric therewith connected to said second shaft, said elements each being reticulated with plural edges defining openings therethrough, and outlet means extending through said housing.

9. A blender comprising a hollow housing, a first relatively large cylindrical reticulated element in said housing and having relatively small openings therethrough defined by plural edges, a second relatively small cylindrical reticulated element within said first element and having relatively large openings therethrough defined by plural edges, said elements being concentric, means for rotating said elements in opposite directions and with the first element at a substantially greater speed than said second element, means for introducing ingredients into said second element, and outlet means in said housing for ingredients which have passed through said elements.

10. A blender comprising a hollow housing, a first relatively large sheetlike reticulated body of revolution in said housing having relatively small openings therethrough defined by plural edges, a second relatively small sheet-like reticulated body of revolution within and concentric with said first body and having relatively large openings therethrough defined by plural edges, means for rotating said bodies in opposite directions, means for introducing ingredients into said second body, and outlet means in said housing for blended ingredients.

11. The blender of claim 10, said reticulated bodies being expanded metal.

12. A blender comprising a hollow housing, a first relatively large sheet-like reticulated body of revolution in said housing and having relatively large openings therethrough defined by edge means, a second relatively small sheet-like reticulated body of revolution having relatively small openings therethrough defined by edge means and within and concentric with said first body, means for rotating said bodies at substantially different velocities, means for introducing ingredients into said second body, and outlet means in said housing for blended ingredients.

13. A method of blending ingredients comprising passing said ingredients through a first rapidly moving reticulated sheet-like element having relatively large openings and thereafter passing said ingredients through a second rapidly moving reticulated sheet-like element having relatively small openings.

14. A blender comprising:
(a) a hollow housing,
(b) an inner and an outer body of revolution, said bodies being of expanded metal, with said inner body having larger openings than said outer body,
(c) means mounting said bodies concentrically with respect to each other in said housing,
(d) means for rotating said bodies in opposite directions,
(e) means for introducing ingredients into the interior of said inner body,
(f) and outlet means in said housing for discharging ingredients which have passed through said outer body.

15. A blender comprising:
(a) a hollow housing,
(b) an inner and an outer cylinder, said cylinders being of expanded metal, with said inner cylinder having larger openings than said outer cylinder,
(c) means mounting said cylinders concentrically with respect to each other in said housing,
(d) means for rotating said cylinders in opposite directions,
(e) means for introducing ingredients into the interior of said inner cylinder,
(f) and outlet means in said housing for discharging ingredients which have passed through said outer cylinder.

16. A blender comprising:
(a) a hollow housing,
(b) an inner and an outer cylinder, said cylinders being of expanded metal,
(c) means mounting said cylinders concentrically with respect to each other in said housing,
(d) means for rotating said cylinders in opposite directions and said outer cylinder at a greater speed,
(e) means for introducing ingredients into the interior of said inner cylinder,
(f) outlet means in said housing for discharging ingredients which have passed through said outer cylinder,
(g) and said inner cylinder having openings which are larger than openings in said outer cylinder.

17. The blender of claim 16, said inner and outer cylinders having a peripheral velocity of approximately 4,200 feet per minute and 8,350 feet per minute, respectively.

18. A blender comprising:
(a) a hollow housing,
(b) an inner and an outer cylinder, said cylinders being of expanded metal, with said inner cylinders having larger openings than said outer cylinders,
(c) means mounting said cylinders concentrically with respect to each other in said housing,
(d) means for rotating said cylinders in opposite directions and said outer cylinder at a greater speed,
(e) means for introducing ingredients into the interior of said inner cylinder,
(f) and outlet means in said housing for discharging ingredients which have passed through said outer cylinder.

19. A blender comprising:
(a) a hollow housing,
(b) an inner and an outer cylinder, said cylinders being of expanded metal,
(c) means mounting said cylinders concentrically, with respect to each other in said housing,
(d) means rotating said inner cylinder at a peripheral velocity of approximately 4,200 feet per minute and said outer cylinder at a peripheral velocity of approximately 8,350 feet per minute,
(e) means for introducing ingredients into the interior of said inner cylinder,
(f) and outlet means in said housing for discharging ingredients which have passed through said outer cylinder.

20. The blender of claim 19, said inner cylinder having diamond shaped openings nominally three-fourths by one and one-half inches and said outer cylinder having diamond shaped openings nominally one-half by one inch.

21. A blender comprising:
(a) a hollow housing,
(b) an inner and an outer cylinder, said cylinders being of expanded metal,
(c) means mounting said cylinders concentrically with respect to each other in said housing,
(d) means for rotating said cylinders in opposite directions, including a shaft drivingly connected to said inner cylinder,
(e) means for introducing ingredients into the interior of said inner cylinder, said means including a feed screw mounted upon said shaft,
(f) and outlet means in said housing for discharging ingredients which have passed through said outer cylinder.

22. A method of blending ingredients comprising passing said ingredients through a first rapidly rotating reticulated multi-edged thin and sheet-like body of revolution having relatively large openings,
and thereafter passing said ingredients through a second reticulated multi-edged thin and sheet-like body of revolution spaced from said first body rotating at a substantially different velocity and having relatively small openings.

23. The method of claim 22, wherein said bodies are rotated in opposite directions.

References Cited

UNITED STATES PATENTS

| | | | |
|---|---|---|---|
| 2,295,098 | 9/1942 | Cornell | 259—122 X |
| 1,483,742 | 2/1924 | Nicol | 259—105 X |
| 2,139,274 | 12/1938 | Justice et al. | 259—105 X |
| 2,635,859 | 4/1953 | Dreyfus | 259—26 X |
| 2,793,847 | 5/1957 | Steele | 259—105 X |
| 2,851,257 | 9/1958 | Morgan | 259—122 X |
| 3,062,511 | 11/1962 | Gard | 259—3 |

FOREIGN PATENTS 245,888  7/1963  Australia.

WALTER A. SCHEEL, *Primary Examiner.*

J. M. BELL, *Assistant Examiner.*